US009553489B2

(12) United States Patent
Stornes et al.

(10) Patent No.: US 9,553,489 B2
(45) Date of Patent: Jan. 24, 2017

(54) ELECTRICAL MACHINE FOR SUBMERGED APPLICATION AND ENERGY CONVERSION SYSTEM

(75) Inventors: Stig Ove Stornes, Trondheim (NO); Alexey Matveev, Trondheim (NO); Jörg Höyland, Trondheim (NO); Sigurd Övrebö, Levanger (NO)

(73) Assignee: SmartMotor AS, Trondheim (NO)

( * ) Notice: Subject to any disclaimer, the term of this patent is extended or adjusted under 35 U.S.C. 154(b) by 346 days.

(21) Appl. No.: 13/809,178

(22) PCT Filed: Jul. 5, 2011

(86) PCT No.: PCT/NO2011/000193
§ 371 (c)(1),
(2), (4) Date: Jan. 9, 2013

(87) PCT Pub. No.: WO2012/005597
PCT Pub. Date: Jan. 12, 2012

(65) Prior Publication Data
US 2013/0106111 A1 May 2, 2013

(30) Foreign Application Priority Data

Jul. 9, 2010 (NO) .................................. 20100993

(51) Int. Cl.
*H02K 5/10* (2006.01)
*H02K 5/132* (2006.01)
(Continued)

(52) U.S. Cl.
CPC ............... *H02K 5/132* (2013.01); *F03B 13/10* (2013.01); *F03B 13/18* (2013.01); *F04D 13/08* (2013.01);
(Continued)

(58) Field of Classification Search
CPC ............................. H02K 5/132; H02K 7/1016
(Continued)

(56) References Cited

U.S. PATENT DOCUMENTS 4,333,900 A * 6/1982 Carey .............................. 264/85
4,415,823 A * 11/1983 Jurgens ........................... 310/87
(Continued)

FOREIGN PATENT DOCUMENTS

| CA | 749502 A | 12/1966 |
| CN | 1937371 A | 3/2007 |
| EP | 0067704 A2 | 12/1982 |

OTHER PUBLICATIONS

International Search Report and Written Opinion dated Oct. 25, 2010.
(Continued)

*Primary Examiner* — Hanh Nguyen
(74) *Attorney, Agent, or Firm* — Alix, Yale & Ristas, LLP (57) ABSTRACT

The invention relates to an electrical machine for submerged applications and an energy conversion system for conversion of mechanical energy of unidirectional or reciprocating linear or rotational motion into electric energy and vice versa. The electric energy may be in the form of DC or AC current and voltage. The system is totally submerged in pure or salt water. The enabling element of the invention is multi-pole permanent magnet synchronous machine with separately encapsulated stator and rotor, integrated with mechanical system and power electronics.

17 Claims, 11 Drawing Sheets

(51) Int. Cl.
*F03B 13/10* (2006.01)
*F04D 13/08* (2006.01)
*F04D 29/02* (2006.01)
*H02K 5/128* (2006.01)
*H02K 7/10* (2006.01)
*F03B 13/18* (2006.01)
*H02K 1/18* (2006.01)
*H02K 7/18* (2006.01)

(52) U.S. Cl.
CPC ........... *F04D 29/026* (2013.01); *H02K 5/1285* (2013.01); *H02K 7/1004* (2013.01); *H02K 7/1016* (2013.01); *H02K 11/30* (2016.01); *F05D 2300/43* (2013.01); *F05D 2300/603* (2013.01); *H02K 1/185* (2013.01); *H02K 7/1807* (2013.01); *Y02E 10/22* (2013.01); *Y02E 10/38* (2013.01)

(58) Field of Classification Search
USPC .......... 310/87, 156.26, 90, 67 R, 68 R, 68 A
See application file for complete search history.

(56) References Cited

U.S. PATENT DOCUMENTS

| | | | |
|---|---|---|---|
| 5,962,938 A * | 10/1999 | Bobay et al. | 310/67 R |
| 6,069,421 A * | 5/2000 | Smith et al. | 310/43 |
| 7,029,339 B2 * | 4/2006 | Brach et al. | 440/6 |
| 7,679,249 B2 | 3/2010 | Appa et al. | |
| 2005/0121915 A1 | 6/2005 | Leijon et al. | |
| 2006/0125243 A1 | 6/2006 | Miller | |
| 2010/0026002 A1 | 2/2010 | Spooner | |
| 2010/0201129 A1 * | 8/2010 | Holstein et al. | 290/53 |

OTHER PUBLICATIONS

Ugalde, G. et al., "Analysis of Rotor Eddy Current Loss in Fractional Slot Permanent Magnet Machine with Solid Rotor Back-Iron," XIX International Conference on Electrical Machines—ICEM 2010, Rome, IEEE Piscataway, NJ, USA.
Luk, P. C. et al. "Back Iron Design for High Speed PM Axial Flux Generators," Magnetics Conference, 2003, IEEE International.
http://www.hobbyking.com/hobbyking/store/__23771__CR50S__50__62__580KV__Contra__Rotating__Brushless__Motors.html (Retrieved on Feb. 17, 2016).

* cited by examiner

ELECTRICAL MACHINE FOR SUBMERGED APPLICATION AND ENERGY CONVERSION SYSTEM

The invention relates to an electrical machine for submerged applications, according to the preamble of claim 1.

The invention also relates to an energy conversion system for conversion of mechanical energy of unidirectional or reciprocating linear or rotational motion to electric energy and vice versa, according to the preamble of claim 15. The electric energy may be in the form of DC or AC current and voltage. The system and electrical machine are especially related to submerged application, i.e. submerged in pure or salt water.

BACKGROUND

Submerged power conversion systems may have applications in wave-, tidal- and hydro power conversion plants, auxiliary subsea generators, submerged blade pitching systems, subsea winches, propulsion systems, thrusters, in-pipe generators, etc. These applications are characterized by different types of primary motion.

Based on the difference in motion and on existing solutions the prior art overview below is given in two stages: first, publications on tidal- and hydro applications and then on wave energy conversion and subsea winches. Other applications may be attributed to one of the named groups of applications.

Tidal and hydro applications are characterized by rotational motion. Usually there is a turbine which rotates in one direction at slowly variable speed. The direction of the rotation may change in tidal applications but this take place only twice a day, so one may regard the system as having continues rotation in one direction.

For tidal and hydro applications there have recently been proposed several solutions with electrical machines integrated into the turbines and operating with water in the gap between separately encapsulated stator and rotor. Overview of the solutions is given below.

Electric machine disclosed as a part of the water turbine and liquid pump presented in WO2004/113717 (Royrvik, 2004) has the stator consisting of coils and encapsulation material only. Neither iron teeth nor back iron is used.

Electrical machine in OpenHydro's U52010/0026002 (Spooner, 2010) also operates with water in the gap between stator and rotor. It is slotless, but unlike the machine in WO2004/113717 it uses element made of ferromagnetic winding for conducting magnetic flux. Also the machine has diode rectifiers for each coil, connected together to provide DC voltage output from the machine.

Two publications of Clean Current Power Systems—CA2615808A1 and GB2442622B disclose axial-flux machines. CA2615808A1 (Allison, 2003) proposes a machine with two counter-rotating rotor disks with magnets on the root of the blades and encapsulated coils on stator without any iron cores.

GB2442622B (Platon, 2009) proposes a stator consisting of a row of E-shaped iron segments with a coil in each segment. The segments are separately encapsulated. There are gaps between the neighboring segments. Each coil is equipped with an individual electronics unit, and the units are connected together into a network to form a common DC voltage output.

To increase rotational speed at which mechanical-to-electrical energy conversion is carried out sometimes there are used various mechanical transmission systems. For example, in publication U.S. Pat. No. 7,530,224 B2 (Fraenkel, 2009) hydraulic speed increasing transmission is used for a tidal turbine.

The features of the solutions reviewed above, which may lead to concrete drawbacks compared to the solution proposed in the current invention, can be summarized as follows:
- the machines do not have complete iron cores in the stator or do not have iron cores at all,
- there are electronics units belonging to the individual segments, the units are connected into a network resulting in DC output from the machine operating as a generator,
- using speed increasing gears.

The solution with incomplete stator iron cores will lead to high stray fields, as there is no closed iron path for magnetic flux, and as a consequence lower power density, lower efficiency and power factor. In addition having the incomplete iron cores (E-cores) will result in lower structural stiffness, which is important for machines with large diameter. Given the strong attraction forces between magnets and iron E-cores, ensuring constant gap between stator and rotor would require a substantial carrying structure, which may be quite expensive.

The solution with electronics units at each segment will result in numerous electrical connections which may lead to lower reliability. Moreover, the AC voltage rectification at the segments will lead to non-sinusoidal voltage and current in the coils, resulting in additional losses and lower efficiency.

So, electric machine solutions for tidal- and hydro power conversion units known from the prior art suffer from either low efficiency or high cost or both.

Subsea winches may have cyclic loads and operate with changing direction of rotation in both motoring and generating mode.

Wave energy conversion is usually characterized by a reciprocating linear motion. There are a number of concepts applying linear electrical machines for power extraction. The linear motion however may be translated into rotational motion by using winch-like arrangements (system of pulleys). Rotation in one direction due to raise of a floater may be followed by uncoiling a line (string) from a pulley and rotation of a shaft. Then rotation in reversed direction is followed by coiling the string back on the pulley which may be forced by a mechanical spring. Examples are described in publications US 2006273594 A1 (Gehring, 2006) and U.S. Pat. No. 4,208,877 (Davis, 1980). This type of arrangements can provide energy extraction only when the floater is rising, so while rotating only in one direction.

In principle power can be extracted at motion (rotation) in both directions. It was shown as early as in 1978 by Budal and Falnes (GB 1522661) who patented a system with two counter-moving floaters (buoys), where one is floating on the surface and one is submerged. Instead of the submerged floater there may be used a counter-weight (sinker bar) like in publications GB 2062113 A (Ortega, 1981) and GB 2192671 A (Shim Hyun Jin, 1988).

Further, it is quite usual to try to transform the bidirectional reciprocating rotation of the pulley into unidirectional rotation. Often there is a mechanical device (gear) for transformation of the reciprocating motion to unidirectional motion to ensure continues rotation of an electrical machine in one direction. Examples are already cited publications GB 1522661 and GB 2062113 A.

Power production from energy of waves is often intermittent or oscillating, thus measures are taken to stabilize power output. In the above mentioned publications GB 1522661 and US 2006273594 A1, as well as in GB 2408075 A (Stansby, 2005), a flywheel is used to flatten the power oscillations, while in publication GB 2192671 A a storage battery is applied for the same purpose.

In all the considered applications the electrical machine is accommodated either above the water surface (GB 2062113 A, GB 2408075 A) or in an encapsulated chamber to prevent contact with sea water like in publications US 2006273594 A1, WO 2007125349 A2 (Masters, 2007) and WO 2009105011 A1 (Sidenmark, 2009).

To increase rotational speed at which mechanical-to-electrical energy conversion is carried out, there are used various mechanical transmission systems, such as gearboxes, like in publication GB 2192671 A and AU 2007202995 A1 (Fraenkel, 2007).

If more than one primary element (floaters, sinker bars) is used, the rotation in different directions may be characterized by different force and linear speed. Examples are above cited publications GB 2408075 A and WO 2009105011 A1, where pulleys with different diameters are used for coiling/uncoiling strings moving in opposite directions, so working with different force and speed.

The ideas from the above publications on wave energy conversion relevant to the current application may be summarized in the following set of concepts:
Using mechanical spring for return motion.
Generator rotation has constant direction (unidirectional) due to use of special gear.
Flattening power output by using either a flywheel or an energy storage battery.
As in many of the applications the primary motion is characterized by low speed, gearboxes are used to increase the speed.
Accommodation of electrical machines in isolated chambers (pressurized, air or oil-filled). Consequent use of rotating seals where the shaft leaves the isolated chamber.
Masses of floaters and, if used, counter-weights can be adjustable to achieve resonance with frequency of the waves.

The main requirements to practically any renewable energy converter are high reliability, long life time and low material, production and operation costs. Difficulties with meeting the requirements explain the relatively low commercial use of the wave- and tidal power plants today.

The above mentioned system components affect cost and reliability in the following way:
(a) System cost is high due to use of:
isolated pressurized chamber,
energy storage device,
gear for translation of reciprocating motion to unidirectional,
gear for speed increase.
(b) System reliability is low and lifetime is short due to use of:
rotating seals, which are the main wear parts in any subsea device that uses this kind of arrangement,
gear for translation of reciprocating motion to unidirectional,
gear for speed increase,
isolated pressurized chamber,
energy storage devices.
(c) System efficiency is reduced due to use of:
mechanical (friction) losses in rotating seals,
mechanical losses in gear for translation of reciprocating motion to unidirectional,
mechanical losses in gear for speed increase.

It can be seen that these are the same components that affect negatively all the important performances (cost, reliability, efficiency, lifetime) of the total system.

Object

The main object of the invention is to provide an electrical machine for energy conversion systems and a system for energy conversion that partly or entirely solves the above mentioned problems of prior art, i.e. provides higher efficiency, lower material and production costs and longer life time.

An object of the invention is to get rid of:
gear for translation of reciprocating motion to unidirectional,
gear for speed increase,
isolated pressurized chamber,
energy storage devices,
rotating seals, which are the main wear parts in any subsea device that uses this kind of arrangement.

It is also an objective to provide an electric machine that would have higher power density, higher efficiency and higher structural stiffness than existing direct drive solutions for tidal and hydro applications.

It is also an object of the invention to provide an electrical machine, which may be integrated with a mechanical part of an energy conversion system for translation of linear motion to rotation and with electronics for providing DC power or AC power with constant frequency at the system output.

An electrical machine according to the disclosed system, along with its preferable features is described in herein.

A system for wave energy conversion according to the another embodiment of the disclosure is also described.

The applications discussed above are in general characterized by low rotational speed (usually below 200 rpm). This is the reason why gearboxes are used in many of them to bring the speed up to a level where standard electrical machines could be applied for energy conversion. In the present invention it is proposed to use a low-speed high-torque machine, such as a multi-pole synchronous machine with permanent magnets. It allows getting rid of the gearboxes.

The machines with permanent magnets can have a relatively wide gap between stator and rotor. This provides a possibility to encapsulate stator and rotor separately and have water (or other fluid) flowing between them. The gap may be as large as several millimeters (compared to traditional machines where it usually is fraction of millimeters) providing the space needed for encapsulation. For example ⅓ of the gap is water, ⅓ of the gap is encapsulation on the stator and ⅓ of the gap is encapsulation on the rotor. As the active parts of the machine are encapsulated there is no need for an isolated pressurized chamber. It provides the opportunity to use the electrical machine in energy conversions systems at considerable depths near the sea or river bottom. At the sea bottom the temperature is lower than near the surface, therefore cooling is better and the electrical machine may have more compact design which means using less active materials and lower cost. Furthermore, as no pressurized chamber is used there is no need for any rotating seals. As the speed in the application is low, the friction losses in the gap will be quite small.

The iron core of the disclosed machine is complete providing a closed path for magnetic flux and ensuring necessary mechanical stiffness.

According to the disclosure it is preferred to couple the electrical machine with a power electronics converter for AC-to-DC conversion in generating mode and DC-to-AC conversion in motoring mode. In generating mode the rotation of the electrical machine rotor, in both directions, is rectified by the converter into constant DC voltage with pulsating current/power at the energy conversion system output. Equally, in motoring mode the input DC voltage may be converted to bidirectional rotation of the electrical machine and, if required, to cyclic operation. When power is generated at rotation in one direction the DC power output is stable.

The power electronics converter is preferably arranged close to the electrical machine or integrated with the electrical machine. Therefore, it should be encapsulated as well.

It is possible to have one or more energy storage devices at DC-side of the converter for flattening the power output in energy conversion applications having a reciprocating motion, however, such devices are expensive, so, instead the disclosure benefits from the fact that generation units are usually used not alone but in parks. Power production cycles of the units in the park may be synchronized so that average produced power is stable. DC voltage at the output of an individual unit is better as DC is more convenient than AC as the inter-park voltage and DC is better to transfer over long distances due to lower losses and cheaper cables.

A low-speed high-torque multi-pole permanent magnet machine usually has a ring-shape, so it is well-suited for mechanical integration. Also a radial-flux machine may be preferable as it is easier to assemble and integrate with a mechanical system whatever it is.

There are several ways to encapsulate active parts of the electrical machine, i.e. stator and rotor. Process of encapsulating stator and rotor is by injection molding or a casting process. It can also be a metal cover/shield on the rotor and polymer or composite encapsulation on stator.

Accordingly the invention is based on using a permanent magnet synchronous machine (PMSM) with separately encapsulated rotor and stator.

The machine is coupled with a submerged AC/AC or AC/DC power electronics converter.

The machine may be integrated with a mechanical parts of energy conversion system.

The machine may use traditional closed bearings, magnetic or a water lubricated bearings.

The electrical machine will be suitable for submerged power conversion systems having applications in wave-, tidal- and hydro power conversion plants, auxiliary subsea generators, submerged blade pitching systems, subsea winches, propulsion systems, thrusters, in-pipe generators, etc.

Further details and preferable features of the invention will appear from the following example description.

EXAMPLE

The invention will below be described in detail with reference to accompanying drawings, where.

Figure 1A:
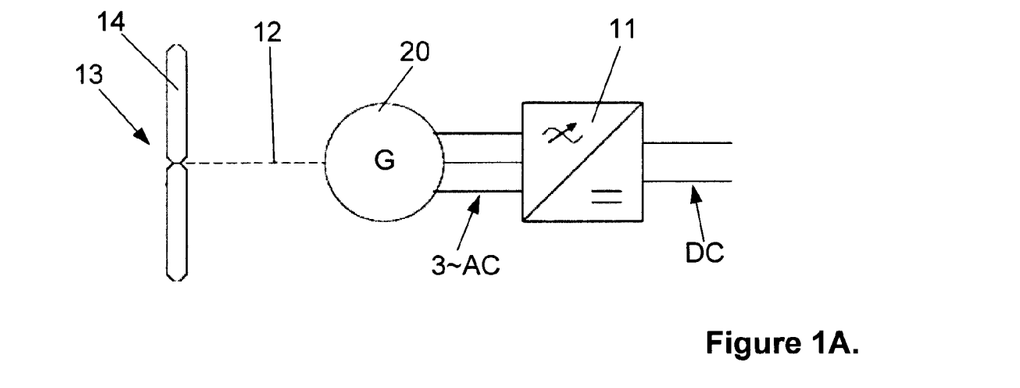
FIGS. 1A-C show an energy conversion system topology and three typical load types.
Figure 1B:
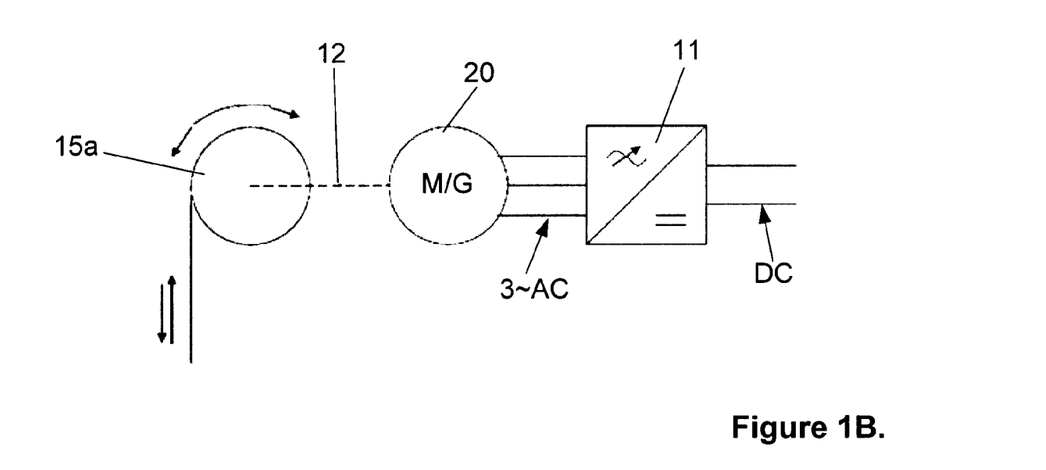
Figure 1C:
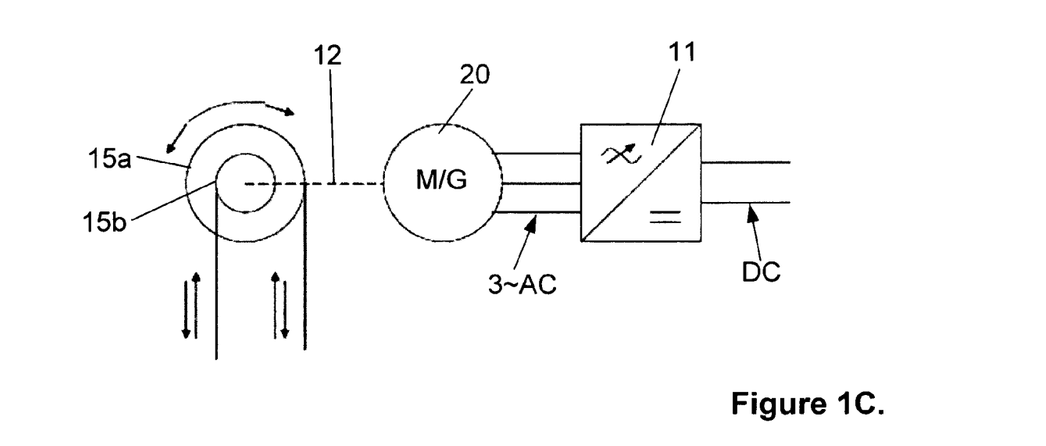

Reference is now made to FIG. 1A-C which show energy conversion system topologies and load types for which the invention has been proposed. FIG. 1A shows unidirectional motion with constant load, FIG. 1B shows bidirectional (reciprocating) movement with one primary mover and FIG. 1C shows bidirectional (reciprocating) movement with two primary movers.

An energy conversion system according to the disclosure includes as main elements an AC/DC converter 11, an electrical machine 20 (motor "M" or generator "G" depending on mode of operation), as well as a mechanical link 12 (shaft or direct integration) to a mechanical system 13. The mechanical system 13 may be a primary mover itself, for example a turbine 14, like in FIG. 1A, or a system of one or more pulleys 15a-b for translation of linear motion into rotational motion. There may be one pulley 15a, like in FIG. 1B, or two and more pulleys 15a-b, like in FIG. 1C.

Figure 2A:
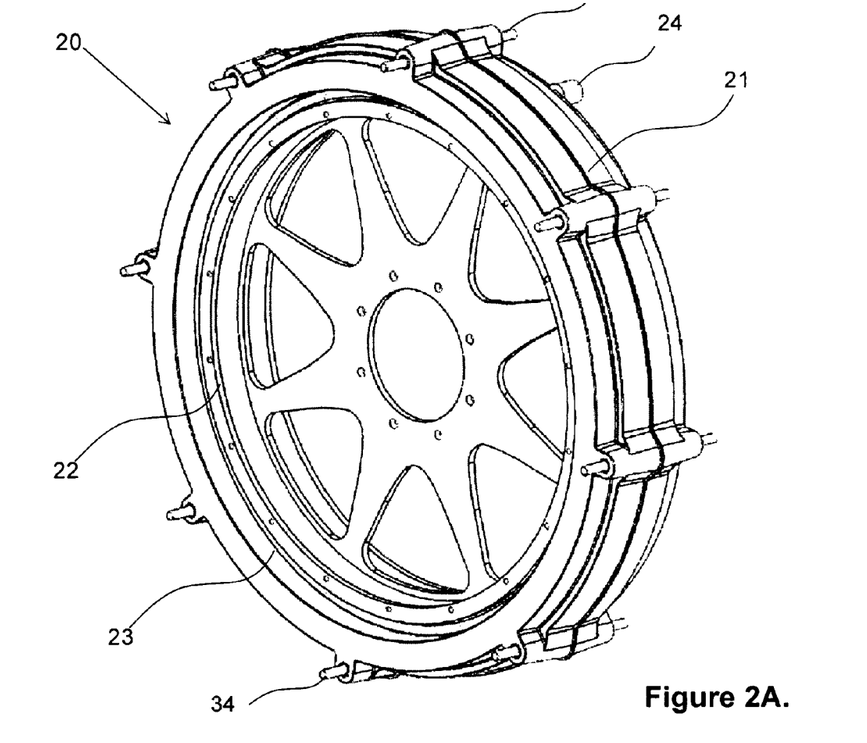
FIG. 2A shows an exterior view of an electrical machine with separately encapsulated stator and rotor.

Reference is now made to FIG. 2A which presents an embodiment of the disclosure and covers design of the electrical machine 20 which enables all the further modifications. The electrical machine 20 has a stator 21 and a rotor 22, which are encapsulated separately, so that a gap 23 between them is open to the surroundings, i.e. that there, for example, is water (or other fluid) in the gap 23 between them. There is socket 24 integrated into an encapsulating material 25 for subsea plug connection of an electrical cable.

Figure 2B:
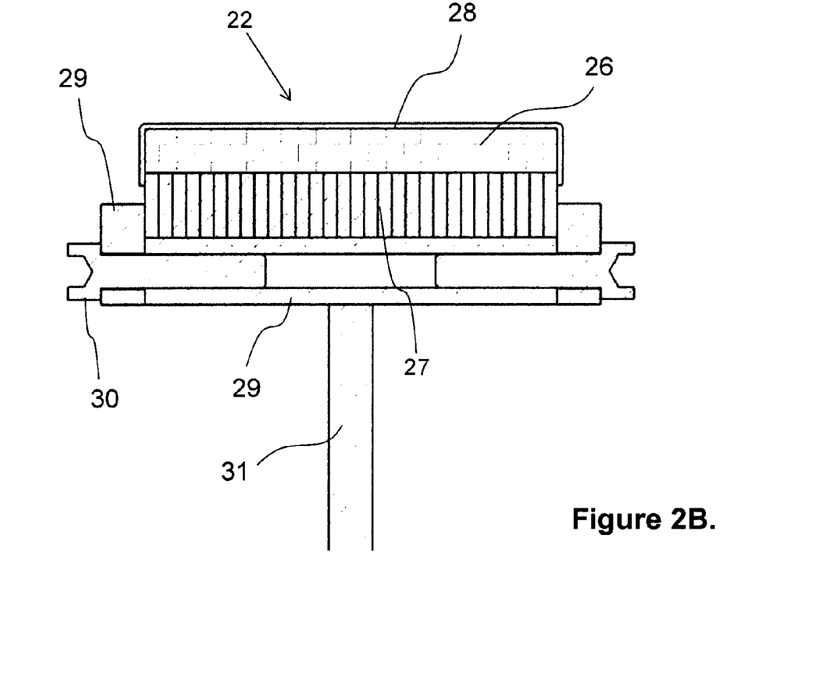
FIG. 2B shows a cross-section of a rotor with a protection casing over the magnets and with parts of a carrying structure.

In FIG. 2B a variant of rotor encapsulation is shown. Magnets 26 of the rotor 22 are fixed on a back iron 27 and are preferably covered by a protective casing 28 made for example of stainless steel. The active parts are held by elements of a carrying structure 29 by using screws 30. The carrying structure 29 is preferably fastened to a rotor disk 31.

Figure 2C:
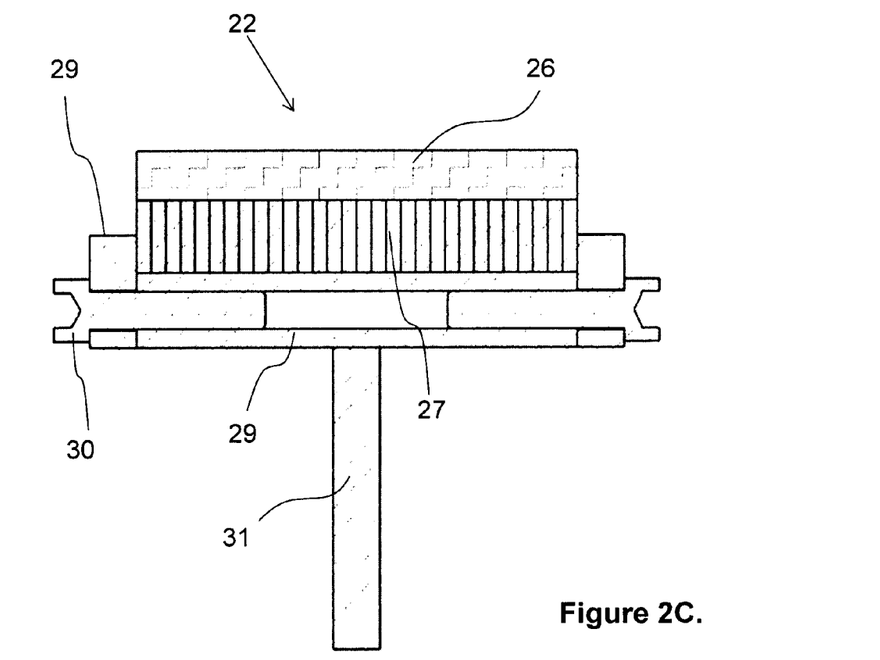
FIG. 2C shows a cross section of a rotor with protection of magnets by a special anti-corrosion layer and painting, and with parts of a carrying structure.

In FIG. 2C alternative variant of rotor encapsulation is shown. The magnets have corrosion-proof surface and are additionally protected by special paint.

Figure 2D:
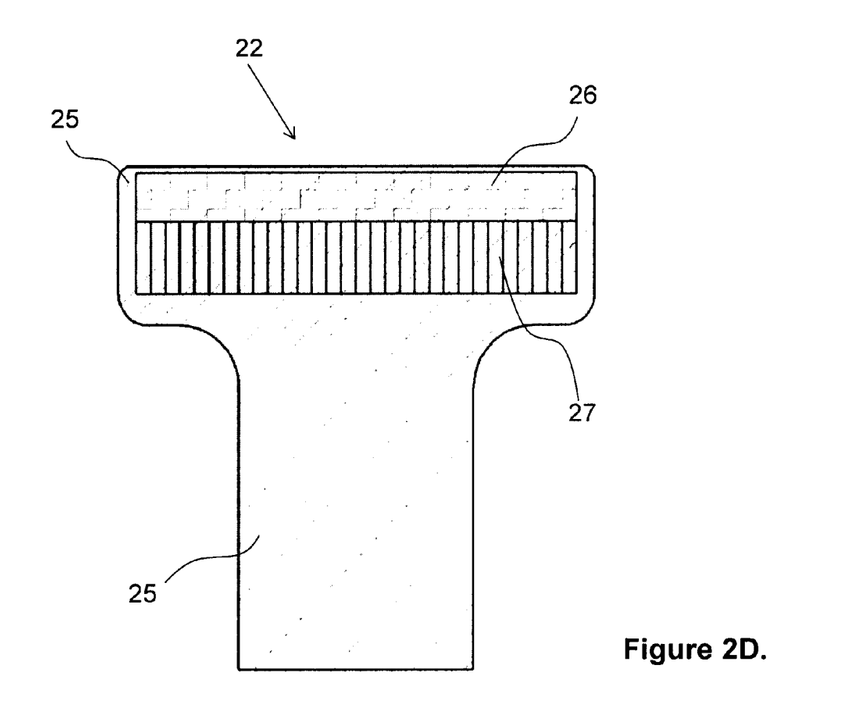
FIG. 2D shows a cross section of a rotor where active parts are held by an encapsulation material, which acts as the carrying structure.

In FIG. 2D one more variant is shown. The active parts are molded into the encapsulation material 25 which acts as the carrying structure and the rotor disk 31. The rotor disk 31 may be made solid to reduce friction losses when rotating or have holes to economize material.

Figure 2E:
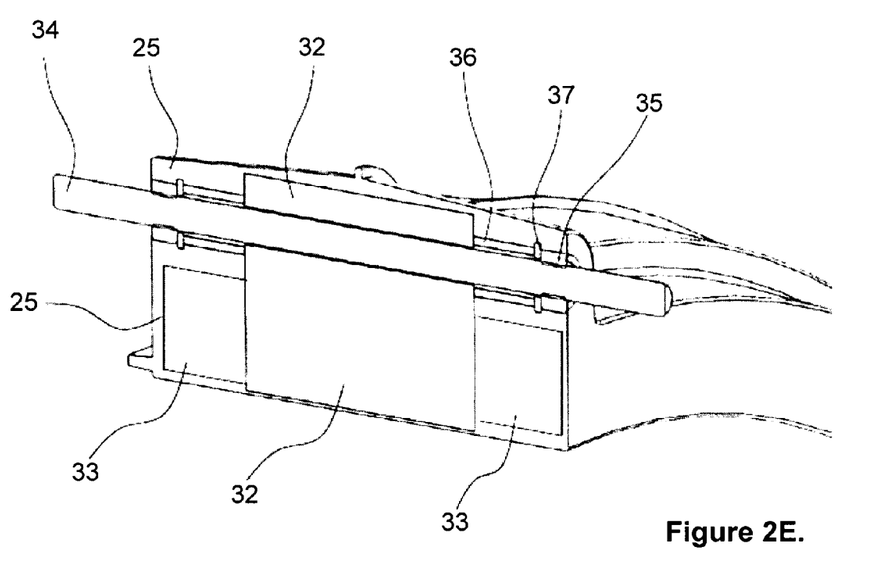
FIGS. 2E and 2F show cross sections of FIG. 2A from different angles to show more details of the stator of the electrical machine.

Reference is now made to FIG. 2E which shows a cross-section of the electrical machine 20 of FIG. 2A. The electrical machine 20 includes stator laminations 32 and windings 33, where both stator laminations 32 and windings 33 are covered by an encapsulating polymer or fiber reinforced plastic (FRP) material 25. The electrical machine 20 further includes rotor back iron 27 and permanent magnets 26 which also are covered by layer of encapsulating composite material 25 as well. One of variants of support structure is using threaded pins 34 and nuts 35 to fix active parts to a stator support structure and rotor support structure. It can be seen that there is a gap 23 between the separately encapsulated stator 21 and rotor 22.

Figure 2F:
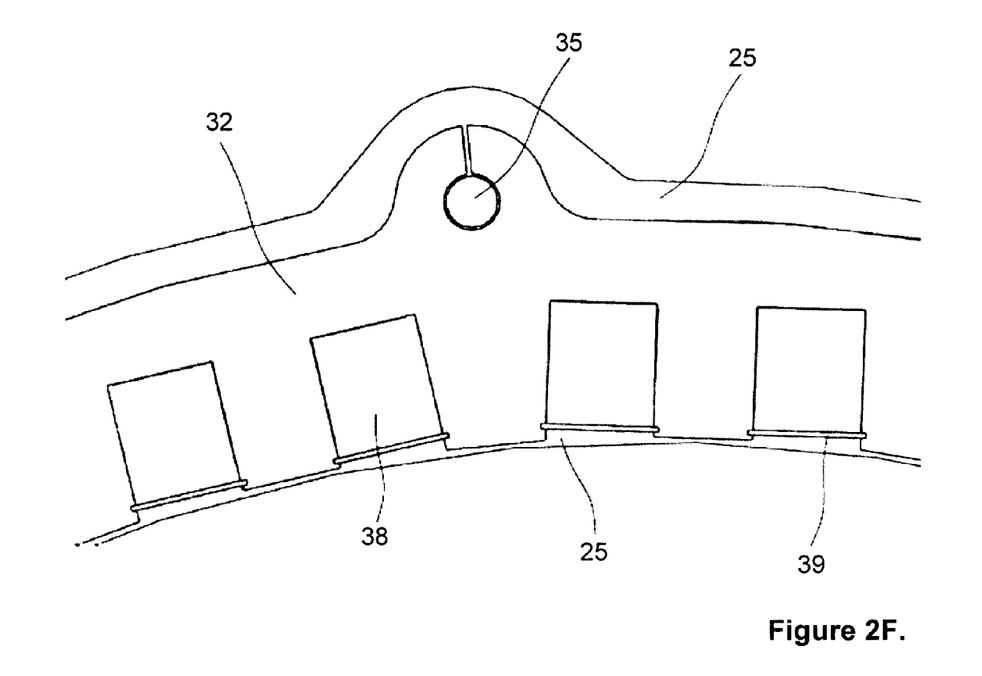

The threaded pin 34 preferably goes directly through the laminations 32 as shown in FIGS. 2E and 2F. No casing around stator 21 is used. Spacers 36 and washers 37 may be used together with the threaded pin 34 to improve reliability of the structure and simplify assembly. FIG. 2F also shows a winding 38 (coil sides) in slots and slot wedges 39.

Figure 3A:
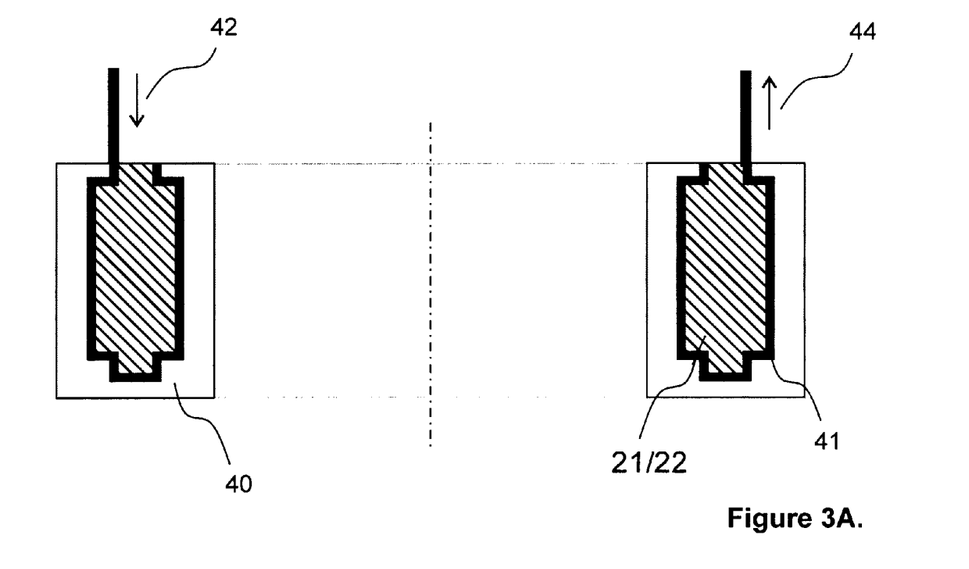
FIGS. 3A-D show details of a molding process.
Figure 3B:
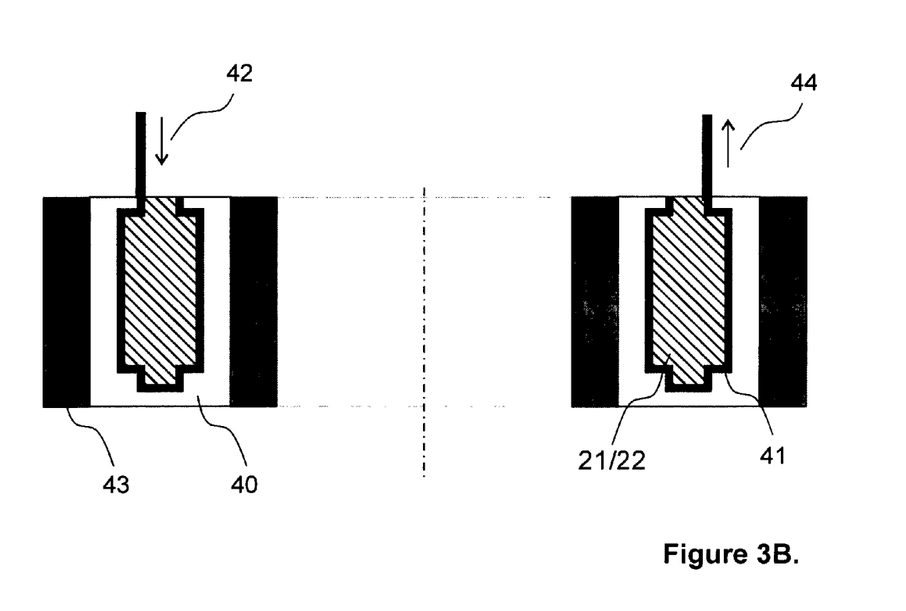

Encapsulation of active parts of stator 21 or rotor 22 can be done in either an open or closed molding process. FIG. 3A illustrates a cross section of a stator 21 in an open molding process. A mold 40 can be made of either a rigid or flexible material. The mold 40 can be made as a single part or split into multiple parts that are assembled together. Resin 41 is poured into the mold from the top 42, filling a void between the stator 21 and mold 40. Higher quality castings are achieved if the resin 41 and mold 40 are put in a vacuum chamber during the casting process. A high level of vacuum allows air to be extracted from the resin 41 and avoids air enclosure during casting, resulting in higher electrical and mechanical properties of the cured resin. If a flexible material is used to create the mold 40, the mold 40 can be stiffened by the usage of a supporting frame 43 at the inner and outer radius (FIG. 3B).

Figure 3C:
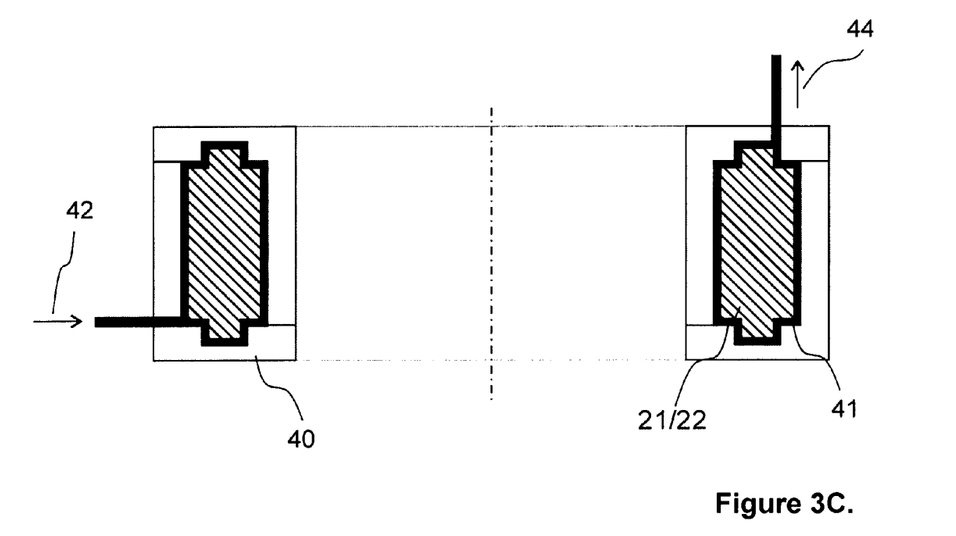
Figure 3D:
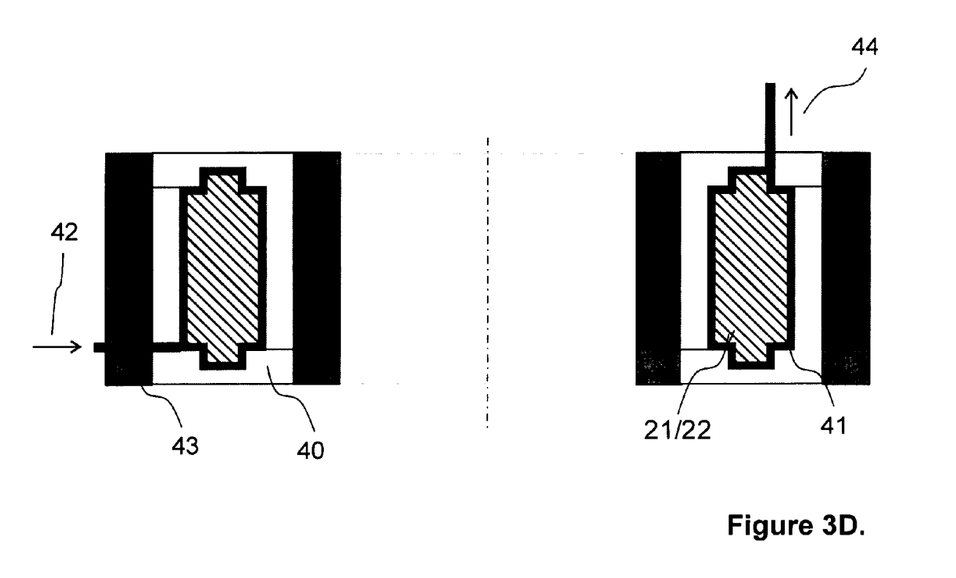

In order to get high tolerances on all surfaces of the stator 21 or rotor 22 casting, a closed molding process can be used. The mold 40 in FIG. 3C is split in two or more parts and can be made of either flexible or rigid material. In order to increase tolerances for the flexible mold, a supporting frame 43 can be used at the inner and outer radius. In a closed molding process it is highly important to position the resin inlet 42 and outlet 44 correctly in order to avoid unfilled spaces in the casting. The resin inlet 42 should be placed close to the lowest point, whilst the resin outlet 44 should be placed at the point where the resin is expected to arrive last. For increased mechanical and electrical properties the closed molding can be done in a vacuum chamber. Supporting frame 43 can be used for stiffening (FIG. 3D).

With the basis of the above described electrical machine 20 and energy conversion system topologies, examples of integration of the electrical machine 20 with a mechanical system 13 will now be described.

Figure 4A:
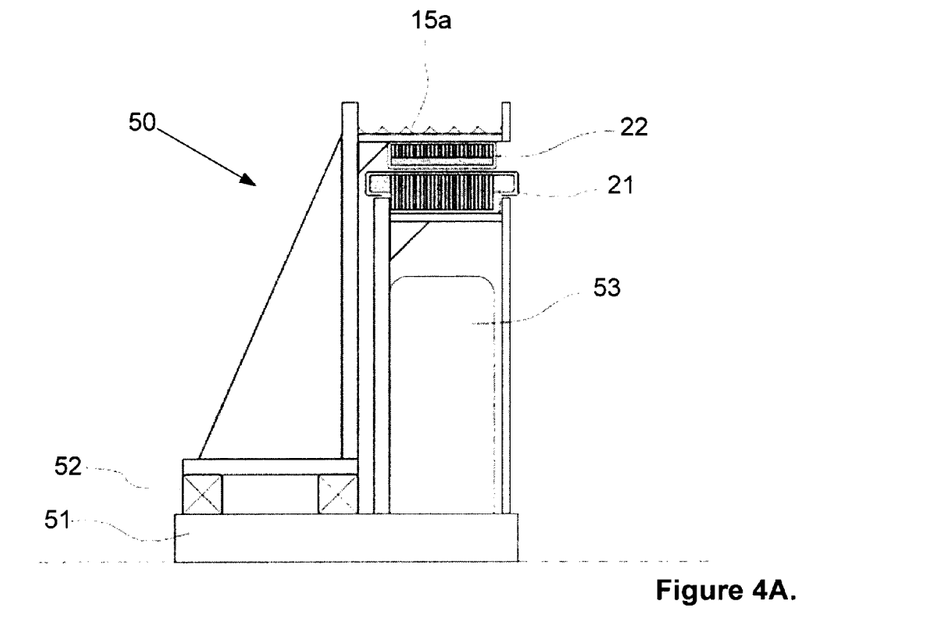
FIGS. 4A-B show integration of an electrical machine with one-pulley winch (on this and the following figures the machine has internal stator and external rotor)
Figure 4B:
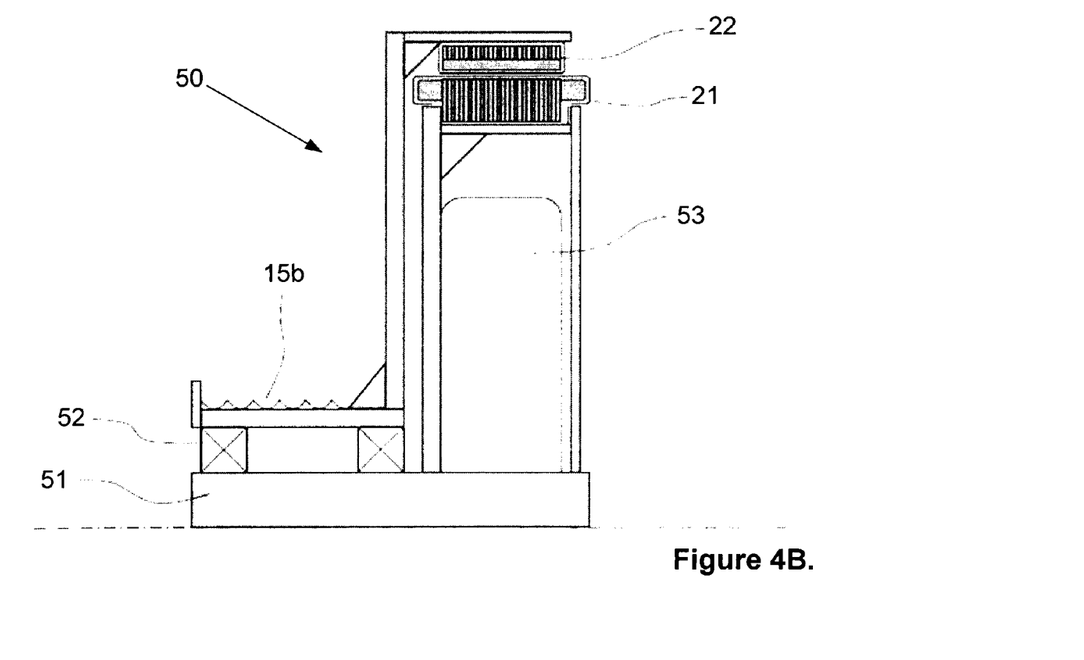

Reference is now made to FIGS. 4A-B which show integration of the electrical machine 20 with outer rotor 22 and inner stator 21 with a winch-like arrangement 50, such as a one-pulley winch. If a pulley 15a has a large diameter, then an arrangement like in FIG. 4A may be used and if a pulley 15b has a small diameter, then an arrangement like in FIG. 4B may be used. In both these arrangements there are used a shaft 51 and bearings 52 and a container 53 for electronics which is placed inside the stator 21.

Figure 5A:
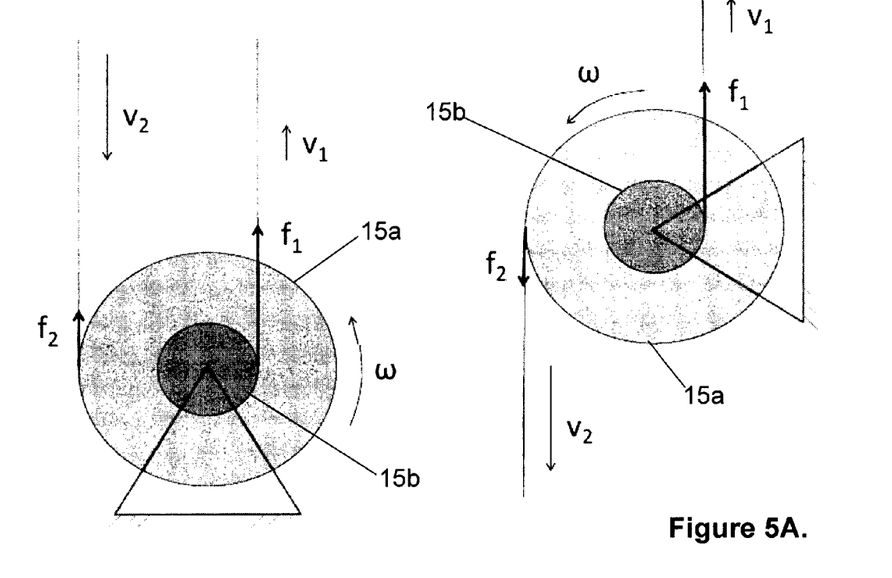
FIG. 5A illustrates a principle of operation of an energy conversion system with two primary movers.
Figure 5B:
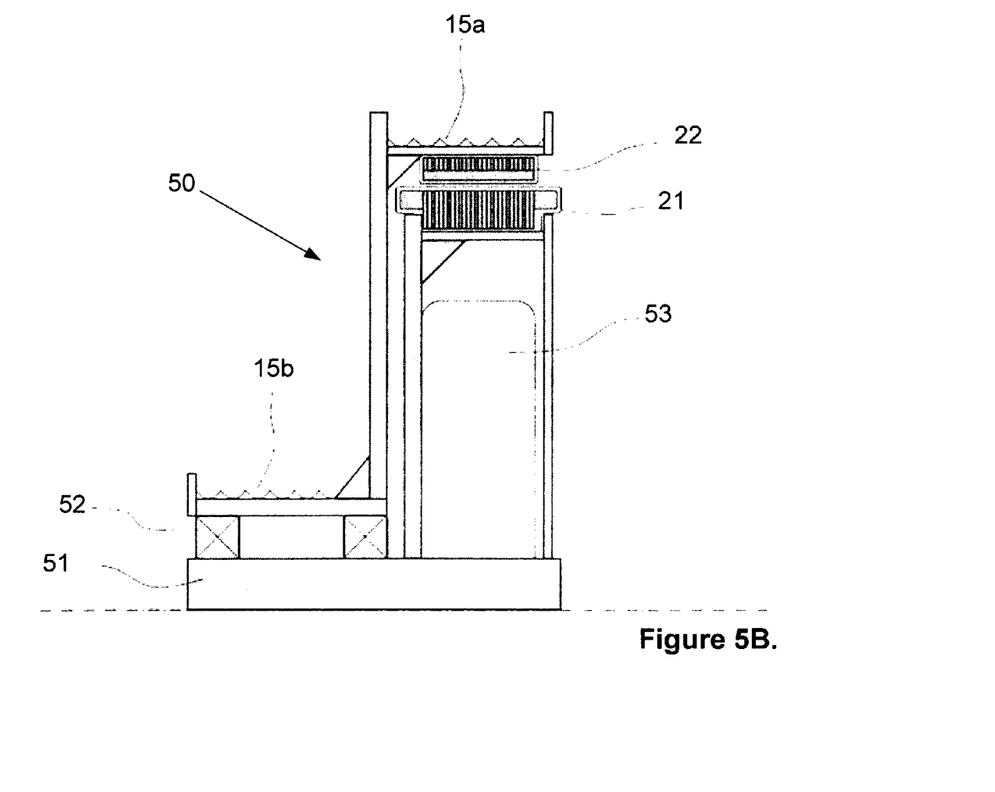
FIGS. 5B and 5C show integration of the electrical machine with a two-pulley winch.
Figure 5C:
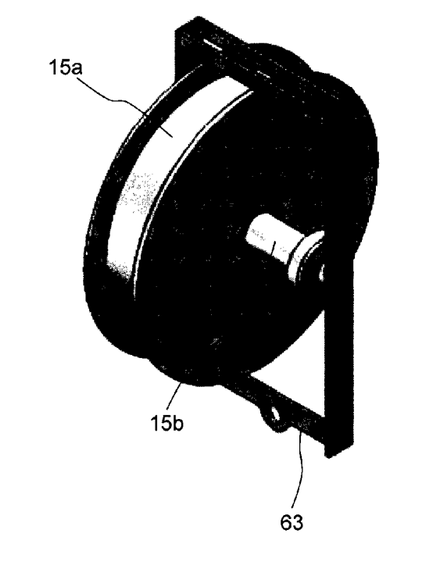
Figure 6:
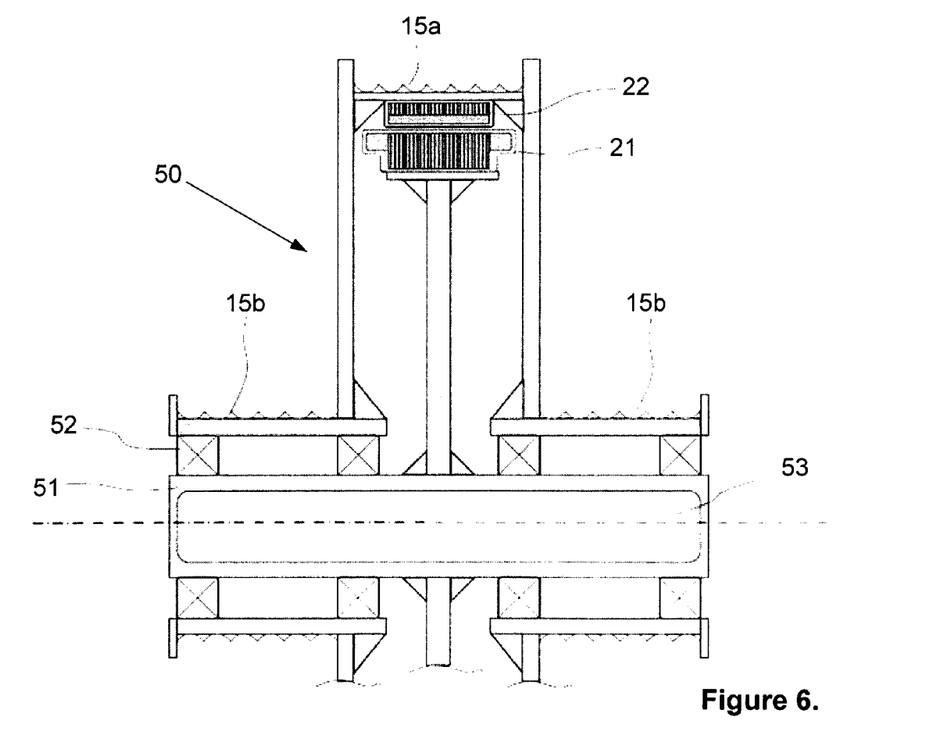
FIG. 6 shows integration of the electrical machine with three-pulley winch.

As it was mentioned before it is possible to have an arrangement with two pulleys 15a-b of different diameter to convert two linear motions into rotation with different applied forces and speeds, as shown in FIGS. 5A-C. This arrangement sets new challenges for the energy conversion system but also gives new opportunities. If the electrical machine 20 is ring-shaped, as will be the case of a permanent magnet motor, the electrical machine may be integrated into a two-pulley system as shown in FIG. 5A-C to form winch-motor or winch-generator. When the winch rotates the pulleys 15a-b may provide coiling a string on one of them while uncoiling another string from the other. This system can be further developed into three-pulley device as shown in FIG. 6. In FIG. 6 it is shown a winch-arrangement 50 having one pulley 15a with a large diameter and two pulleys 15b with a small diameter.

Figure 7:
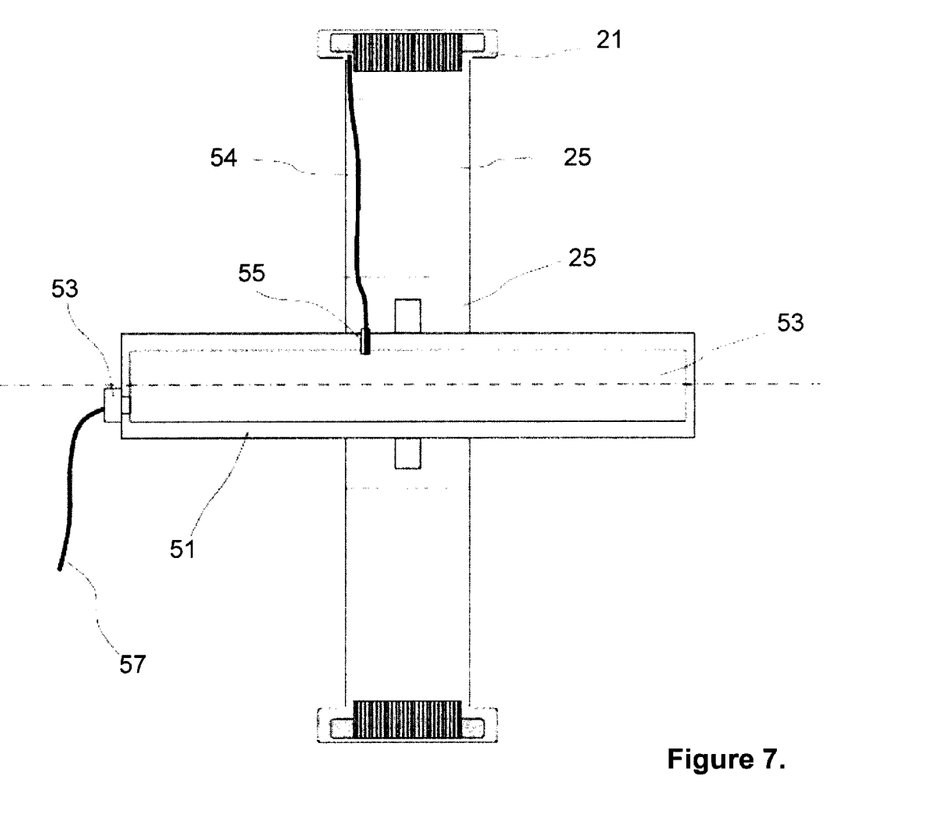
FIG. 7 shows a stator design where a support structure is made of the same polymer or composite material as the encapsulation.

A cost-efficient solution for an internal stator 21 is presented in FIG. 7 where the encapsulation material 25 is used as a supporting structure. The encapsulation 25 is designed so that it contains the shaft 51 and the active parts of the stator 21. The winding 38 (end-winding) on stator 21 is connected by a cable 54 to the container 53 for electronics inside the shaft 51, which cable 54 runs through an opening 55 into the compartment 53. Then encapsulation material 25 is injected to cover the active parts and the cable 54, and form the carrying structure for the stator 21 on the shaft 51. To transfer high torques, the shaft 51 may have salient metal parts penetrating the encapsulating material 25. The container 53 is also provided with a subsea connector 53 for the connection of a DC cable 57 for output power.

When the electrical machine 20 is designed for operation at relatively high speed, the holes in rotor disk may be covered by thin plates in order to reduce water friction losses when the disk is rotating.

Figure 8:
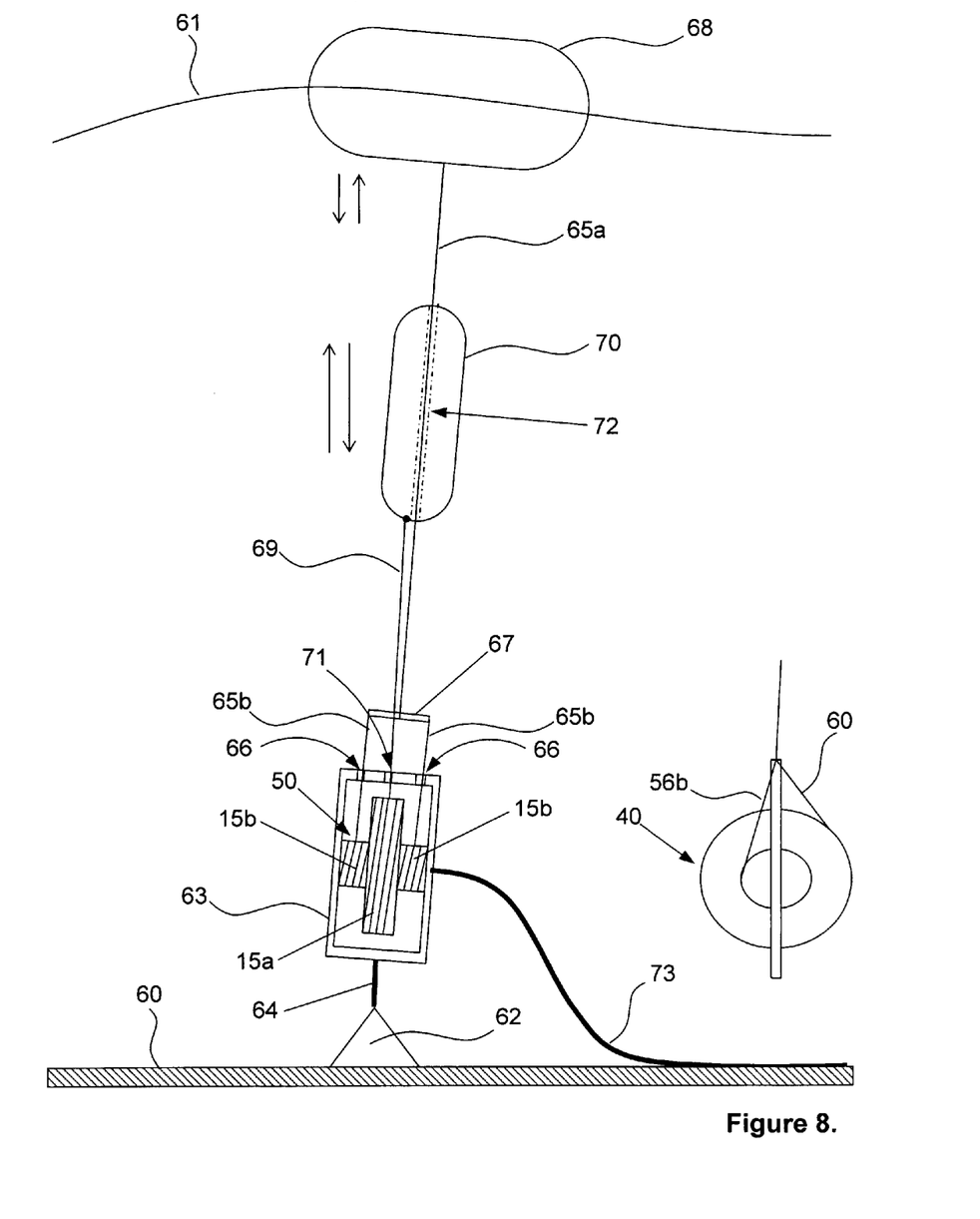
FIG. 8 shows an example of an energy conversion system according to the invention.

Reference is now made to FIG. 8 which shows an example of an energy conversion system according to the invention for a wave energy conversion application. The energy conversion system extends from a sea bottom 60 and to a sea surface 61 (waves). The energy conversion system includes an anchor 62 for arrangement of the system to the sea bottom 60. The system further includes a holding frame 63 arranged to the anchor 62 by means of a suitable construction 64. The holding frame 63 is adapted for the arrangement of a winch-like arrangement 50, like the ones shown in FIGS. 4A-B, 5A-C and 6. In this example a winch-like arrangement 50 like in FIG. 6 is shown, having two small pulleys 15b and one large pulley 15a. The winch-like arrangement 50 is securely fixed inside the holding frame 63. To the small pulleys 15b there are arranged parts of a main string 65b which extend in the vertical direction out of the holding frame 63, via through holes 66 to a joining element 67 for simultaneously movement of the small pulleys 15b. From the joining element 66 a main cord 65a extends in the vertical direction to a main floater 68, such as a buoy, arranged floating at the sea surface 61.

To the large pulley 15a of the winch-like arrangement 50 it is arranged a secondary cord 69 which extends in the vertical direction to a submerged floater 70 extending out of the holding frame 63 via a through hole 71 and coiling on the large pulley 15a. The submerged floater 70 is preferably provided with a through hole 72, through which the main cord 65a extends to the surface floater 68.

From the holding frame 63 extends an electric cable 73 for the output power from the electrical machine 20 via AC/DC, AC/DC/AC or AC/AC converter.

In this way it is provided an energy conversion system which is powered by the waves. As the floaters 68 and 70 move up and down in the vertical direction due to wave movements, the winch-like arrangement 50 coils and uncoils strings on the pulleys 15a-b, resulting in that electricity is provided by the electrical machine 20 and can be transported by means of the electrical cable 73 onshore or to be used by maritime/offshore applications, such as for powering a fish farming (pumps, winches), farms for sea weeds for bio fuel (winches) and the like.

A system of floaters may be designed so that its natural frequency is close to frequency of sea oscillations. As the sea oscillation frequency varies with time, the system may be controlled (using the electronics) so that mechanical resonance is achieved, providing higher energy harvesting.

Modifications

There can be used various system modifications. For example, one floater can be arranged to more than one holding frame/winch arrangement or several floaters can be arranged to one holding frame/winch arrangement.

The electrical machine can be used in applications using contra rotation, where the rotor rotates in one direction and the stator rotates in the other direction.

The electrical machine can further consist of multiple stators or rotors, or stator or rotor active parts, where all active parts of the stator are attached to a common stator carrying structure and all active parts of the rotor are attached to a common rotor carrying structure.

The electrical machine may also be divided in two or more parts to ease production or transportation of the machine.

A thin layer of a material of highly thermally conductive may be added on the periphery of the stator to enhance cooling. The thin layer would be in direct contact with the laminations on one side and a surrounding fluid on the other side. The surrounding fluid could be air, water, oil or any other fluid the machine could be submerged into. The thin layer could in addition be used for protection of the laminations.

Even though it is described that the electrical machine is used in a conversion system for wave energy it is obvious that it also may be used in application like tidal- and hydro power conversion plants, auxiliary subsea generators, submerged blade pitching systems, subsea winches, propulsion systems, thrusters, in-pipe generators, etc.

The invention claimed is:

1. An electrical machine (20) for submerged applications, comprising a stator (21) including a complete laminated core (32) and winding (33) providing a multiple-phase AC output voltage, and a rotor (22) consisting of rotor back iron (27) and permanent magnets (26), wherein the stator (21), including both laminated core (32) and windings (33), is separately encapsulated in composites (25) or a polymer and the rotor (22) is protected by encapsulation in either composites (25) or a polymer separate from the encapsulation of the stator (21), or magnets (26) of the rotor (22) are fixed on a back iron (27) and covered by a protective surface separate from the encapsulation of the stator (21), wherein a gap (23) between the stator (21) and the rotor (22) is open to surrounding fluid and the stator (21) is not enclosed in a housing.

2. The electrical machine according to claim 1, wherein the electrical machine (20) is a low-speed high-torque machine, such as a multi-pole synchronous machine with permanent magnets.

3. The electrical machine according to claim 1, wherein the stator (21) is made only of laminations (32), winding (33) and a polymer or composites (25).

4. The electrical machine according to claim 1, wherein the stator (21) is molded, solid and fully encapsulated, with no air or fluid within the encapsulation.

5. A method of manufacturing the electrical machine according to claim 1, comprising encapsulating the stator (21) or rotor (22) by employing a vacuum process.

6. A method of manufacturing the electrical machine according to claim 1, comprising encapsulating the stator (21) or rotor (22) by employing a combination of vacuum process and pressurization process.

7. The electrical machine according to claim 1, including a rotor-carrying structure (29) being made entirely of composites or a polymer and arranged for holding the back iron (27) and the permanent magnets (26) arranged to a shaft (51).

8. The electrical machine according to claim 1, wherein the stator (21) is internal and the rotor (22) is external, the stator (21) being provided with a container (53) for electronics arranged inside the stator (21).

9. The electrical machine according to claim 7, including a stator-carrying structure being made entirely of composites or a polymer and arranged for holding the laminated core (32) and the winding (33) arranged to a shaft (51).

10. The electrical machine according to claim 1, wherein the stator (21) and the rotor (22) are rotating in opposite directions.

11. The electrical machine according to claim 1, wherein the stator (21) or the rotor (22) or both are assembled from at least two parts.

12. The electrical machine according to claim 1, comprising a thin layer of a thermally conductive material positioned at the periphery of the stator (22) in direct contact with the laminations on one side and a surrounding fluid on the other side.

13. The electrical machine according to claim 1, wherein the magnets (26) of the rotor (22) are fixed on a back iron (27) and are protected by a corrosion resistant paint.

14. The electrical machine according to claim 1, wherein the magnets (26) of the rotor (22) are fixed on a back iron (27) and the protective surface is made from stainless steel.

15. The electrical machine according to claim 1, wherein the encapsulation of the stator (21) is configured to accommodate fastening means (34-37) for attachment of the stator (21) to a separate stator support structure.

16. The electrical machine according to claim 1, wherein the encapsulation of the stator (21) is configured to accommodate a pin (34) for fixing the stator (21) to a separate stator support structure.

17. The electrical machine according to claim 16, wherein the pin (34) has threads for mating with a nut (35) to fix the stator (21) to the stator support structure.

* * * * *